United States Patent Office 3,499,003
Patented Mar. 3, 1970

3,499,003
3-[2-(3-AMINOPYRROLIDINYL)-ETHYL]-INDOLES
William J. Welstead, Jr., Richmond, Va., assignor to A. H. Robins Company, Incorporated, a corporation of Virginia
No Drawing. Continuation-in-part of application Ser. No. 504,088, Oct. 23, 1965. This application Mar. 7, 1968, Ser. No. 711,227
Int. Cl. C07d 27/56
U.S. Cl. 260—326.14           10 Claims

ABSTRACT OF THE DISCLOSURE

Novel 3-[2-(3-aminopyrrolidinyl)-ethyl]-indoles are disclosed which have anti-Parkinsonism activity. The indole compounds can be further substituted on the indole moiety. The amino group in the 3-position of the pyrrolidine ring is secondary or tertiary amino group. The novel compounds are prepared from appropriately substituted indoles and glyoxyl chloride. Reaction of the indole-3-glyoxyloyl chloride and 3-aminopyrrolidines to give the corresponding 3-indoleglyoxamide followed by reduction of the latter compound using lithium aluminum hydride gives the novel compounds.

---

The present invention relates to certain heterocyclic organic compounds which may be referred to as 3-(omega-substituted alkyl) indoles and is more particularly concerned with 3-[3-mono- and 3- disubstituted aminopyrrolidinyl]ethyl indoles, acid addition and quaternary ammonium salts thereof, therapeutic compositions containing the same as active ingredients, and the methods of making and using them.

This application is a continuation-in-part of my copending application Ser. No. 504,088 filed Oct. 23, 1965, and now abandoned.

The novel compounds of the present invention have utility as physiologically active agents and are particularly effective in diminishing the tremors and muscular rigidity of Parkinsonism.

Prior art literature contains examples of 3-(2-disubstituted aminoalkyl) indoles. Those which have been examined in animal bodies have shown limited therapeutic value and are not disclosed to have anti-Parkinson activity. More recently a series of 1-, 2-, and 3-[2-(4-substituted piperazinyl)ethyl] indoles has been the subject of U.S. Patent 3,188,313 with the disclosure of their therapeutic application as CNS depressants. However, these are likewise not disclosed to have anti-Parkinsonism activity.

Medicaments that have been used to ameliorate the symptoms of Parkinsonism have been derived from the belladonna group of alkaloids, particularly atropine and scopolamine; in addition, synthetic medicinals such as Parsidol (TM), Artane (TM), Kemadrin (TM), and Disipal (TM), among others, and certain antihistamine compounds have been used with varying degrees of success. Although all of the aforementioned drugs have been of therapeutic value in treating the tremors and muscular rigidity of Parkinsonism, prior to this invention no single preparation has been found to be universally tolerated and the dosages have had to be adjusted to the particular individual. Moreover, all previously known drugs which have been demonstrated to be useful in treating Parkinsonism have produced undesirable side effects, and in some instances the effective therapeutic does produces the toxic symptoms common to all the drugs, including, for example, dryness of mouth, nausea, giddiness, blurred vision, nervousness, tinnitus, sore mouth, mental confusion, marked agitation, epigastric burning, heavy feeling in the limbs or sensations of tingling in them, disorientation, anorexia and transient psychotic episodes. The ability to suppress the distressing and sometimes incapacitating symptoms of Parkinsonism without concurrent undesirable side effects is highly desirable in an anti-Parkinson agent. Agents possessing this ability have been diligently sought.

It is therefore an object of the present invention to provide novel compounds that are useful in the palliative treatment of Parkinsonism. An additional object is the provision of compounds useful as anti-Parkinson agents and which produce minimal side effects. A further object is to provide a method of using said anti-parkinson drugs in the treatment of living animal and especially mammalian bodies. A still further object is to provide pharmaceutical compositions which embody the said agents. A still further object is to provide a method for preparing said novel 3-(omega substituted alkyl) indoles. Additional objects will be apparent to one skilled in the art and still further objects will become apparent hereinafter.

The novel compounds of the present invention can best be represented by the following formula:

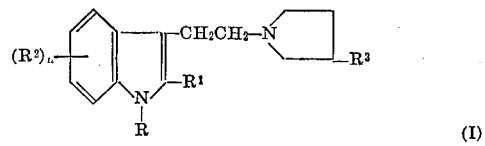

(I)

Wherein R is selected from the group consisting of hydrogen, lower-alkyl, lower alkanoyl, benzoyl, phenyl, substituted phenyl, phenyllower alkyl and cycloalkyl, Wherein $R^1$ is selected from the group consisting of hydrogen, lower-alkyl and phenyl, Wherein $R^2$ is selected from the group consisting of hydrogen, halogen having an atomic weight less than 80, trifluoromethyl, hydroxyl, lower-alkyl, lower-alkoxy and aralkoxy, Wherein $R^3$ is amino, Wherein $n$ is an integer from 1–4 inclusive, and acid addition and quaternary ammonium salts thereof.

In the definition of symbols in the foregoing Formula I and where they appear elsewhere throughout this specification, the terms have the following significance.

The term "lower-alkyl" as used herein includes straight and branched chain radicals of up to five carbon atoms inclusive and is exemplified by such groups as methyl, ethyl, n-propyl, isopropyl, n-butyl, sec-butyl, amyl and the like. "Lower-alkoxy" has the formula —O—lower-alkyl. The term "cycloalkyl" as used herein includes primarily cyclic alkyl radicals containing three up to nine carbon atoms inclusive and encompasses such groups as cyclopropyl, cyclobutyl, cyclopentyl, methylcyclohexyl, ethylcyclopentyl and propylcyclohexyl. Included in the term "phenyllower-alkyl" are groups such as benzyl, phenethyl, methylbenzyl, phenpropyl and the like. "Lower-alkanoyl" has the formula

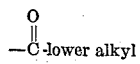

"Aralkoxy" has the formula —O—lower-alkyl-phenyl. "Benzoyl" has the formula

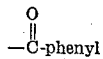

A substituted phenyl radical is a phenyl radical substituted by one or more substituents selected from the group consisting of halogen having an atomic weight less than 80, lower-alkyl, hydroxy, carboxy, lower-alkoxy and trifluoromethyl. The lower-alkyl and lower-alkoxy radicals can contain up to three carbon atoms inclusive and each phenyl radical, together with said substituents, can contain from six to nine carbon atoms inclusive. When the phenyl radical is substituted by more than one of the above substituents, the substituent can be the same or different and can occupy any of the available positions on the phenyl ring. When the substituents is lower-alkyl, said substituent can be straight or branched and can contain from one to about three carbon atoms inclusive.

Among the suitable amino radicals included within the symbol $R^3$ are primary, secondary and tertiary amino radicals, such as unsubstituted amino (—$NH_2$); lower-alkyl-amino; dilower-alkyl-amino, phenylamino, diphenylamino, (hydroxy-lower-alkyl)-amino, di-(hydroxy-lower-alkyl)-amino, lower-alkyl-(hydroxy-lower-alkyl)-amino, lower-alkynyl-amino, phenyl-(lower-alkyl)-amino, phenyl-(lower-alkanoyl)-amino and benzoyl-(lower-alkyl)-amino.

This invention also includes acid addition salts of the above defined bases formed with nontoxic organic and inorganic acids. Such salts are easily prepared by methods known in the art.

When the compounds are to be used as intermediates for preparing other compounds or for any other non-pharmaceutical use, the toxicity or non-toxicity of the salt is immaterial. When the compounds are to be used as pharmaceuticals, they are most conveniently used in the form of non-toxic acid-addition or quaternary ammonium salts. Both toxic and non-toxic salts are therefore within the purview of the invention. The acids which can be used to prepare the preferred non-toxic acid-addition salts are those which produce, when combined with the free bases, salts whose anions are relatively innocuous to the animals organism in therapeutic doses of the salts, so that beneficial physiological properties inherent in the free bases are not vitiated by side effects ascribable to the anions.

The base is reacted with the calculated amount of organic or inorganic acid in aqueous miscible solvent, such as ethanol or isopropanol, with isolation of the salt by concentration and cooling, or the base is reacted with an excess of the acid in aqueous immiscible solvent, such as ethyl ether or isopropyl ether, with the desired salt separating directly. Exemplary of such organic salts are those with maleic, fumaric, benzoic, ascorbic, pamoic, succinic, methanesulfonic, acetic, propionic, tartaric, citric, lactic, malic, citraconic, itaconic, hexamic, p-aminobenzoic, glutamic, stearic and the like. Exemplary of such inorganic salts are those with hydrochloric, hydrobromic, sulfuric, sulfamic, phosphoric and nitric acids.

In addition, this invention includes pharmaceutically acceptable, non-toxic quaternary ammonium salts of the above defined bases. The quaternary ammonium salts are readily formed by treatment of the corresponding free base with the appropriate salt-forming substance, including, for example, methyl chloride, methyl bromide, methyl iodide, methyl sulfate, ethyl chloride, ethyl bromide, ethyl iodide, n-propyl chloride, n-propyl bromide, n-propyl iodide, isobutyl iodide, sec-butyl bromide, n-amyl chloride, n-amyl bromide, n-amyl iodide, isoamyl chloride, n-hexyl chloride, n-hexyl bromide, n-hexyl iodide, or similar quaternary salt-forming substances, according to general procedures which are well known in the art.

It will be readily apparent to one skilled in the art that certain compounds of this invention may be present as optical isomers. The connotation of the general formulas presented herein is to include all isomers, the separated d or l isomers as well as the dl mixtures of these isomers.

In general, the novel compounds of this invention are prepared starting from readily available selected indoles or from indoles prepared by the Fischer indole synthesis. The indoles are reacted with oxalyl chloride at 0–25° C. according to the procedure of Speeter and Anthony, J. Am. Chem. Soc. 76, 6208–10 (1954) in an organic solvent inert under the conditions of the reaction, such as ether, dioxane, and the like, to give indole-3-glyoxylol chloride. The preferred solvent is ether.

The indole-3-glyoxyloyl chloride is then reacted with a 3-mono- or 3-disubstituted amino pyrrolidine in a suitable solvent such as benzene, chloroform, dioxane, toluene, acetonitrile and the like, which will not enter into the reaction but which will provide a reaction medium. An acid acceptor which may be an excess amount of the reacting pyrrolidine compound, a tertiary amine or an alkali metal salt of a weak acid may be used, the alkali metal salt of a weak acid; e.g., sodium carbonate, sodium bicarbonate, potassium carbonate, and the like being the preferred acid acceptor. It was observed that indole-3-glyoxyloyl chloride is not readily hydrolyzed by water at or about room temperature and in an alternative procedure the reaction between an indole-3-glyoxyloyl chloride and a 3-mono- or 3-disubstituted amino pyrrolidine can be conveniently carried out in a chloroform-water mixture. The alternate method is particularly convenient when the acid acceptor employed is an alkali metal salt of a weak acid. The purpose of the acid acceptor is to take up the hydrogen halide which is split out during the course of the reaction. The reaction is conveniently carried out at or about room temperature for a period of about 3 to 5 hours. Shorter and longer reaction periods are also opeative. Isolation of the product 1-(indol-3-ylglyoxyloyl)-3-substituted pyrrolidine is achieved by dilution of the reaction mixture with water, separation of the organic and aqueous layers, and drying and concentration of the organic layer. The crude products are best purified by crystallization from a suitable solvent, chromatography or formation of a readily crystallizable organic or inorganic salt.

The reduction of the 1-(indol-3-ylglyoxyloyl)-3-substituted pyrrolidines to the novel 3-[2-(3-mono-substituted aminopyrrolidinyl)ethyl]indoles and 3-[2-(3-disubstituted aminopyrrolidinyl)ethyl]indoles of the present invention is achieved by metal hydride reduction in anhydrous tetrahydrofuran. The compound to be reduced is dissolved or suspended in tetrahydrofuran and added dropwise, under nitrogen, to a stirred suspension of lithium aluminum hydride in the aforementioned organic solvent. After refluxing the stirred reaction mixture for a suitable period; e.g., about 2 to 5 hours, the reaction mixture is worked up by procedures well known in the art. The indoles may be purified by vacuum distillation, chromatography or by crystallization of their well-defined organic or inorganic salts.

The preparation of the novel compounds of the present invention is not limited by the preceding described method and they can be prepared by alternative procedures. In one alternative method appropriately substituted indole-3-acetic acids are prepared from appropriately substituted hydrazones by the Fischer indole synthesis. The substituted indole-3-acetic acids thus prepared are reduced by metal hydrides to the corresponding substituted 3-(2-hydroxyethyl)indoles. Reaction of the latter with a thionyl halide furnishes a substituted 3-(2-haloethyl)indole, the gaseous by-products sulfur dioxide and hydrogen halide being removed from the reaction system by application of a slight vacuum or by sweeping the by-product gases out of the reaction system by the use of an inert gas as, for example, nitrogen. By treating the resulting substituted 3-(2-haloethyl)indoles with a selected 3-mono-, or 2-disubstituted aminopyrrolidine in the presence of a suitable acid acceptor which may be an excess of the pyrrolidine compound, a tertiary amine or an alkali metal salt of a weak acid, the desired 3-[2-(3-amino-substituted aminopyrrolidinyl)ethyl]indoles are obtained.

The following examples are given to illustrate the scope of this invention without limiting it thereto:

EXAMPLE 1

1-(indol-3-ylglyoxyloyl)-3-N-methylanilinopyrrolidine

To a stirred suspension of 11.4 g. (0.055 mole) of indole-3-glyoxyloyl chloride in 200 ml. of dry benzene was added dropwise under nitrogen a solution of 9.4 g. (0.053 mole) of 3-N-methylanilinopyrrolidine in 100 ml. of dry benzene. A cream colored solid separated from the reaction mixture. After refluxing the stirred mixture for 2 hours the mixture was cooled, the benzene decanted and the solid residue partitioned between chloroform and 25% aqueous caustic. The chloroform layer was dried over magnesium sulfate and the dried solution concentrated to an oil. The oil was dissolved in alcohol and the alcohol solution treated with water to give 14 g. (76%) of crude solid melting at 189–191° C. Recrystallization from methanol-water gave pure material meling at 191–193° C.

EXAMPLE 2

1-[(5,6-dimethoxyindol-3-yl)glyoxyloyl]-3-N-methyl-anilinopyrrolidine

A stirred suspension of 8 g. (0.03 mole) of 5,6-dimethoxyindol-3-glyoxyloyl chloride and 10 g. of sodium carbonate in 100 ml. of dry benzene was treated dropwise, under nitrogen, with a solution of 5.3 g. (0.03 mole) of 3-N-methylanilinopyrrolidine in 50 ml. of dry benzene. After stirring 2 hours at room temperature the mixture was refluxed 3 hours and allowed to stand over night at room temperature. Water (50 ml.) was added to the reaction mixture which was stirred 1 hour, the layers separated and the benzene layer concentrated to a dark oil. The oil was chromatographed on 300 g. of magnesium silicate (60–100 mesh) eluting the column with benzene with increasing amounts of acetone. Pure product was eluted at 20% acetone-benzene concentration to give 8 g. of 1-[5,6-dimethoxyindol-3-yl)glyoxyloyl]3-N-methyl-anilinopyrrolidine.

EXAMPLE 3

1-(indol-3-ylglyoxyloyl)-3-anilinopyrrolidine

To a well-stirred heterogeneous mixture of 16.2 g. (0.10 mole) of 3-anilinopyrrolidine in 100 ml. of chloroform and 20 g. of potassium carbonate in 100 ml. of water was added at room temperature and in portions, 20 g. (0.0975 mole) of indole-3-glyoxyloyl chloride. After three hours stirring at room temperature, the layers were separated and the chloroform layer, after drying, concentrated to an oil which crystallized on standing. The solid was recrystallized from methanol to give 9.0 g. (30%) of product melting at 170–172° C.

*Analysis.*—Calculated for $C_{20}H_{19}N_3O_2$: C, 72.05; H, 6.74; N, 12.60%. Found: C, 71.63; H, 5.91; N, 13.02%.

EXAMPLE 4

1-(indol-3-ylglyoxyloyl)-3-(2-methoxyaniline)-pyrrolidine

A solution of 19.2 g. (0.1 mole) of 3-(2-methoxyanilino)-pyrrolidine in 100 ml. of chloroform was added to a solution of 25 g. of potassium carbonate in 100 ml. of water. The resulting heterogeneous mixture was stirred vigorously while 20 g. (0.0975 mole) of solid indole-3-glyoxyloyl chloride was added portionwise over several minutes. The mixture was stirred 4 hours then allowed to stand over night during which time some product precipitated. The product was filtered off and washed well with chloroform and water; weight of product was 5.0 g. The chloroform layer was separated, dried over magnesium sulfate and evaporated to an oil which was crystallized from ethanol to give an additional 9.0 g. of product. The ethanol filtrate was evaporated to an oil, the oil dissolved in 25% chloroform-benzene and chromatographed on 100 g. of 60–100 mesh magnesium silicate. From the column was eluted 3 g. of pure product (1–10%-acetone-benzene). Total yield of product 17 g. (48%), M.P. 195–198° C. Recrystallization from acetonitrile raised the melting point to 200–202° C.

*Analysis.*—Calculated for $C_{21}H_{21}N_3O_3$: C, 69.40; H, 5.83; N, 11.56%. Found: C, 69.59; H, 5.84; N, 11.64%.

Using the processes described above, the following compounds are prepared:

1-(indol-3-ylglyoxyloyl)-3-butylaminopyrrolidine.
1-[(5-hydroxyindol-3-yl)glyoxyloyl]-3-N-methylanilino-pyrrolidine.
1-[(5,7-dihydroxyindol-3-yl)glyoxyloyl]-3-N-methyl-anilinopyrrolidine.
1-[(2-methylindol-3-yl)glyoxyloyl]-3-N-ethylanilino-pyrrolidine.
1-[(5,7-dichloroindol-3-yl)glyoxyloyl]-3-N-ethylanilino-pyrrolidine.
1-[(6-trifluoromethylindol-3-yl)glyoxyloyl]-3-anilino-pyrrolidine.
1-[(2,7-dimethyl-4-chloroindol-3-yl)glyoxyloyl]-3-N-ethylanilinopyrrolidine.
1-[(1-benzyl-2-methylindol-3-yl)glyoxyloyl]-3-N-methylanilinopyrrolidine.
1-(indol-3-ylglyoxyloyl)-3-(2-hydroxyethylamino)-pyrrolidine.
1-(indol-3-ylglyoxyloyl)-3-(2,2'-dihydroxydiethylamino)-pyrrolidine.
1-[(1-ethylindol-3-yl)glyoxyloyl]-3-N-methylanilino-pyrrolidine.
1-(indol-3-ylglyoxyloyl)-3-(2-propynylamino)-pyrrolidine.
1-indol-3-ylglyoxyloyl)-3-(N-2-propynylanilino)-pyrrolidine.
1-(indol-3-ylglyoxyloyl)-3-(N-o-methoxyphenylamino)-pyrrolidine.
1-(indol-3-ylglyoxyloyl)-3-(N-2-hydroxyethyl)ethylaminopyrrolidine.
1-(indol-3-ylglyoxyloyl)-3-(N-o-methoxyphenyl)ethyl-aminopyrrolidine.
1-(indol-3-ylglyoxyloyl)-3-(N-o-carboxyphenyl)butyl-aminopyrrolidine.
1-[(2-methylindol-3-yl)glyoxyloyl]-3-diphenylamino-pyrrolidine.
1-[(1-benzoylindol-3-yl)glyoxyloyl]-3-N-methylanilino-pyrrolidine.
1-[(2-phenylindol-3-yl)glyoxyloyl]-3-dibutylamino-pyrrolidine.

EXAMPLE 5

3-[2-(3-N-methylanilinopyrrolidinyl)ethyl]indole hexamate

A suspension of 13 g. (0.038 mole) of 1-(indol-3-ylglyoxyloyl)-3-N-methylanilinopyrrolidine in 100 ml. of tetrahydrofuran was added dropwise, under nitrogen, to a stirred suspension of 7.6 g. (0.20 mole) of lithium aluminum hydride in 100 ml. of tetrahydrofuran. After addition the mixture was refluxed for 2 hours, cooled and treated with enough water to neutralize the excess lithium aluminum hydride. The precipitated aluminum hydroxide was filtered off and washed thoroughly with tetrahydrofuran. The filtrate was concentrated to give 12 g. of crude free base. To 11.5 g. (0.036 mole) of the free base in 50 ml. of hot isopropanol was added a solution of 6.4 g. (0.036 mole) of hexamic acid in 50 ml. of hot isopropanol. After warming several minutes the mixture was treated with isopropyl ether and cooled. The resulting oil crystallized slowly on standing, yielding 6 g. of salt melting at 105–108° C. The mother liquor was evaporated to an oil, neutralized with dilute sodium hydroxide and the free base extracted with chloroform. Distillation of the free base gave 3.85 g. of material boiling at 225–235° C./0.01 mm. The distilled free base was treated with hexamic acid using ethyl acetatemethanol solvent. After boiling off the methanol an oil formed which crystallized on standing yielding an additional 5.8 g. of salt melting at 124–128° C. Identical infrared spectra (chloroform) indicated that the two different melting crops were polymorphs. Recrystallization of both crops separately from isopropanol-isopropyl ether gave 9.7 g. (54%) of a single form melting at 124–128° C.

EXAMPLE 6

2-methyl-3-[2-(3-N-methylanilinopyrrolidinyl) ethyl]indole

A suspension of 14 g. (0.039 mole) of 1-[(2-methylindol-3-yl)glyoxyloyl]-3 - N - methylanilinopyrrolidine in 100 ml. of tetrahydroifuran was added dropwise, under nitrogen, to a stirred suspension of 8.6 g. (0.23 mole) of lithium aluminum hydride in 150 ml. of tetrahydrofuran. After addition the mixture was refluxed for 3.5 hours, cooled and poured carefully into a large volume of water. The mixture was extracted several times with chloroform and the combined extracts dried over magnesium sulfate. Evaporation of the dried organic solution on a rotating evaporator gave an oil which was crystallized from alcohol-water; yield 8.5 g. (65%); melting point 130–132° C. recrystallization of a sample from alcohol-water raised the melting point to 131–133° C.

*Analysis.*—Calculated for $C_{22}H_{27}N_3$: C, 79.24; H, 8.16; N, 12.06. Found: C, 79.59; H, 8.22; N, 13.04%.

EXAMPLE 7

5,6-dimethoxy-3-[2-(3-N-methylanilinopyrrolidinyl) ethyl]indole

A suspension of 8 g. (0.02 mole) of 1-[5,6-dimethoxyindol-3-yl)glyoxyloyl]-3 - N - methylanilinopyrrolidine in 50 ml. of tetrahydrofuran was added dropwise to a stirred suspension of 3.8 g. (0.10 mole) of lithium aluminum hydride in 100 ml. of tetrahydrofuran. After addition the mixture was refluxed under nitrogen for 3 hours, cooled and the excess hydride destroyed carefully with water. The aluminum hydroxide percipitate was filtered off and washed thoroughly with several portions of tetrahydrofuran. The combined filtrates were evaporated under vacuum to a glassy solid which would not crystallize. The material was dissolved in benzene and chromatographed on 250 g. of 60–100 mesh magnesium silicate eluting with benzene then benzene with increasing amounts of acetone. At 15% acetone-benzene concentration pure product was obtained; yield 4.5 g. (60%).

*Analysis.*—Calculated for $C_{23}H_{29}N_3O_2$: C, 72.79; H, 7.70; N, 11.07. Found: C, 72.48; H, 7.78; N, 11.21%.

EXAMPLE 8

3-[2-(3-anilinopyrrolidinyl)ethyl]indole

A suspension of 16 g. (0.048 mole) of 1-(indol-3-ylgyl-oxyloyl)-3-anilinopyrrolidine in 80 ml. of tetrahydrofuran was added dropwise to a stirred suspension of 9 g. (0.23 mole) of lithium aluminum hydride in 300 ml. of tetrahydrofuran. After addition the mixture was refluxed for 2 hours. The mixture was cooled and worked up in the usual manner. The resulting crude oil (14 g.) was dissolved in benzene and chromatographed on 400 g. of 60–100 mesh magnesium silicate. The column was eluted with benzene containing increasing amounts of acetone. The fractions containing pure product were combined and evaporated to yield 11 g. (75%) of product which would not crystallize from a variety of solvents. An analytical sample was molecularly distilled.

*Analysis.* — Calculated for $C_{20}H_{23}N_3$: C, 78.65; H, 7.59; N, 13.76. Found: C, 78.42; H, 7.50; N, 13.81%.

EXAMPLE 9

3-{2-[3-(2-methoxyanilino)pyrrolidinyl]ethyl}indole

A solution of 32.8 g. (0.09 mole) of 1-(indol-3-ylglyoxyloyl)-3-(2-methoxyanilino)-pyrrolidine in 150 ml. of tetrahydrofuran was added dropwise to a stirred suspension of 13.7 g. (0.36 mole) of lithium aluminum hydride in 400 ml. of tetrahydrofuran. After addition the mixture was refluxed 3 hours. After cooling the reaction mixture was worked up in the usual manner and yielded 17.7 g. of crude oily product. The oil was dissolved in benzene and chromatographed on 450 g. of 60–100 mesh magnesium silicate. The column was eluted with benzene containing increasing amounts of acetone. The fractions containing pure product were collected and evaporated to yield 11.9 g. (40%) of oil which crystallized on standing. Recrystallization from benzene-isooctane gave 9.5 g. of crystalline product which melted at 94–96° C.

*Analysis.*—Calculated for $C_{21}H_{25}N_3O$: C, 75.19; H, 7.51; N, 12.53. Found: C, 75.13; H, 7.51; N, 12.50%.

EXAMPLE 10

3-{2-[3-(N-propionyl-2-methoxyanilino) pyrrolidinyl]ethyl}indole

To a stirred mixture of 4.9 g. (0.15 mole) of 3-{2-[3-(2-methoxyanilino)pyrrolidinyl]ethyl}indole and 7 g. of potassium carbonate in 75 ml. of chloroform was added all at once 1.52 g. (0.016 mole) of propionyl chloride. The mixture was stirred 2 hours then treated with 50 ml. of water and 10 ml. of 3 N sodium hydroxide and stirred an additional 2 hours. The chloroform layer was separated, dried over magnesium sulfate and evaporated to an oil. A sample was molecularly distilled for analysis.

*Analysis.*—Calculated for $C_{24}H_{29}N_3O_2$: C, 73.63; H, 7.47; N, 10.73. Found: C, 73.44; H, 7.33; N, 10.76%.

EXAMPLES 11–35

Using the processes described above, the following compounds are prepared:

3-[2-(3-butylaminopyrrolidinyl)ethyl]indole.
5-hydroxy-3-[2-(3-N-methylanilinopyrrolidinyl)ethyl]-indole.
5,7-dihydroxy-3-[2-(3-N-methylanilinopyrrolidinyl) ethyl]-indole.
5,7-dihydroxy-3-[2-(3-N-methylanilinopyrrolidinyl) ethyl]-indole.
2-methyl-3-[2-(3-N-ethylanilinopyrrolidinyl)ethyl] indole.
5,7-dichloro-3-[2-(3-N-ethylanilinopyrrolidinyl)ethyl]-indole.
6-trifluoromethyl-3-[2-(3-anilinopyrrolidinyl)ethyl] indole.
2,7-dimethyl-4-chloro-3-[2-(3-ethylanilinopyrrolidinyl)ethyl]indole.
1-benzyl-2-methyl-3-[2-(3-N-methylanilinopyrrolidinyl) ethyl]indole.
3-{2-[3-(2-hydroxyethylamino)pyrrolidinyl]ethyl} indole.
3-{2-[3-(2,2'-dihydroxydiethylamino)pyrrolidinyl]ethyl} indole.
1-ethyl-3-[2-3-N-methylanilinopyrrolidinyl)ethyl]indole.
3-{2-[3-(2-propynylamino-pyrrolidinyl]ethyl}indole.
3-{2-[3-N-(2-propynyl)anilinopyrrolidinyl]ethyl}indole.
3-{2-[3-(o-methoxyanilino)pyrrolidinyl]ethyl}indole.
3-{2-[3-N-(2-hydroxyethyl)-ethylaminopyrrolidinyl] ethyl}indole.
3-{2-[3-N-(o-methoxyphenyl)ethylaminopyrrolidinyl] ethyl}indole.
3-{2-[3-N-(o-carboxyphenyl)butylaminopyrrolidinyl] ethyl}indole.
2-methyl-3-[2-(3-diphenylaminopyrrolidinyl)ethyl]indole.
2-phenyl-3-[2-(3-dibutylaminopyrrolidinyl)ethyl]indole.
3-[2-(3-N-acetylanilinopyrrolidinyl)ethyl]indole.
3-[2-(3-N-propionylanilinopyrrolidinyl)ethyl]indole.
1-acetyl-3-[2-(3-N-methylanilinopyrrolidinyl)ethyl] indole.
1-benzoyl-3-[2-(3-N-methylanilinopyrrolidinyl)-ethyl] indole.
3-[2-(3-N-benzoylbutylaminopyrrolidinyl)ethyl]indole.

Pharmacology

The compounds of the present invention were screened for anti-Parkinsonism and were observed to be effective in eliminating the pronounced symptom complex of tremor, motor incoordination, lacrimation and catatonia. 4-methoxyphenethylamine is excreted by Parkinson patients, indicating the diseased state to be associated with an abnormally of the normal process by which certain biogenic amines are methylated. [A. M. Ernst, Nature, 193, 178 (1962); Acta. Physiol. Pharmacol. Neerl., 11, 48 (1962); Psychopharmacologia 7,383 (1965)]; [Spoerlein, M. T. and Vander Wende, C., Life Sciences 6, 2029 (1967).] Injection of 4-methoxyphenethylamine (50 mg./kg. i.p.) in mice results in the syndrome of Parkinsonism consisting of tremors, lateral head shake, straub tail, horripilation and lacrimation. The efficacy of the novel compounds of the present invention was determined by administering the compounds to mice. One hour later 4-methoxyphenethylamine was given intraperitoneally (50 mg./kg.). The mice were observed for the symptoms of Parkinsonism and a drug's effectivess was determined by the complete prevention of the Parkinson syndrome described hereinabove.

Merely, by way of example, the compound of Example 5, 3-[2-(3-N-methylanilinopyrrolidinyl)ethyl]indole hexamate given at a dose level of 50 mg./kg. i.p. protected 100% of all mice tested. [$LD_{50}$ 1390 mg./kg. per os; confidence limits 1230–1570 mg./kg. per os.] The compound of Example 6, 2-methyl-3-[2-(3-N-methylanilinopyrrolidinyl)ethyl]indole given at a dose level of 75 mg./kg. i.p. protected 2 out of 3 mice against the syndrome of Parkinsonism. Similarly, the compound of Example 7, 5,6 - dimethoxy - 3-[2-(3-N-methylanilinopyrrolidinyl) ethyl]indole given at a dose level of 25 mg./kg. i.p. protected 2 out of 3 mice tested as described hereinabove. ($LD_{50}$ male mice 750 mg./kg. per os; confidence limit 414–1360 mg./kg. per os: $LD_{50}$ female mice 1260 mg./kg. per os; confidence limit 926–1710 mg./kg. per os.)

The invention further provides pharmaceutical compositions comprising, as active ingredient, at least one of the compounds according to the invention in association with a pharmaceutical carrier or excipient. The compounds may be presented in a form suitable for oral or parenteral administration. Thus, for example, compositions for oral administration can be solid or liquid and can take the form of capsules, tablets, coated tablets, suspensions, etc., such compositions comprising carriers or excipients conveniently used in the pharmaceutical art. Thus suitable tableting excipients include lactose, potato and maize starches, talc, gelatin, and stearic and silicic acids, magnesium stearate, and polyvinyl pyrrolidine.

For parenteral administration, the carrier or excipient may be a sterile, parenterally acceptable liquid; e.g. water or a parenterally acceptable oil; e.g., arachis oil, contained in ampoules.

Advantageously, the compositions may be formulated as dosage units, each unit being adapted to supply a fixed dose of active ingredient. Tablets, coated tablets, capsules, and ampoules are examples of preferred dosage unit forms according to the invention. Each dosage unit adapted for oral administration can conveniently contain 25 to 500 mg., and preferably 100 to 250 mg. of the active ingredient; whereas, each dosage unit adapted for intramuscular administration can conveniently contain 10 to 150 mg., and preferably 50 to 100 mg. of the active ingredient.

Examples of compositions within the preferred ranges given are as follows:

Syrup

| Ingredients: | | Amts./5 cc. |
|---|---|---|
| (1) Active ingredient | mg | 250.0000 |
| (2) Glycerin | ml | 1.2500 |
| (3) Sorbitol solution 70% | ml | 2.5000 |
| (4) Sodium saccharin | mg | 1.0000 |
| (5) Sodium sucaryl | mg | 10.0000 |
| (6) Methyl p-aminobenzoate | mg | 5.0000 |
| (7) Propyl p-aminobenzoate | mg | 0.2500 |
| (8) Curacao flavor | ml | 0.0025 |
| (9) Water q.s. | ml | 5.0000 |

Procedure (1) Dissolve 6 and 7 in hot water.
(2) This solution, when cool, is mixed with No. 3 and the mixture is stirred until uniform.
(3) Dissolve 1, 2, 4, 5, and 8 in this solution and stir until uniform.

Capsules

| Ingredients: | Per cap., mg. |
|---|---|
| (1) Active ingredient | 125.000 |
| (2) Lactose | 146.000 |
| (3) Magnesium stearate | 4.000 |

Procedure (1) Blend 1, 2 and 3.
(2) Mill this blend and blend again.
(3) This milled blend is then filled into No. 1 hard gelatin capsules.

Tablets

| Ingredients: | Mg./tab., mg. |
|---|---|
| (1) Active ingredient | 125.0 |
| (2) Corn starch | 20.0 |
| (3) Kelacid | 20.0 |
| (4) Keltose | 20.0 |
| (5) Magnesium stearate | 1.3 |

Procedure (1) Blend 1, 2, 3 and 4.
(2) Add sufficient water portionwise to the blend from step No. 1 with careful stirring after each addition. Such additions of water and stirring continue until the mass is of a consistency to permit its conversion to wet granules.
(3) The wet mass is converted to granules by passing it through the oscillating granulator, using 8-mesh screen.
(4) The wet granules are then dried in an oven at 140° F.
(5) The dried granules are then passed through an oscillating granulator, using a 10-mesh screen.
(6) Lubricate the dry granules with 0.5% magnesium stearate.
(7) The lubricated granules are compressed on a suitable tablet press.

Intramuscular injection

| Ingredients: | Per. ml. |
|---|---|
| (1) Active ingredient | 50 mg. |
| (2) Isotonic buffer solution 4.0 | Q.s. to 2.0 ml. |

Procedure (1) Dissolve the active ingredient in the buffer solution.
(2) Aseptically filter the solution from Step No. 1.
(3) The sterile solution is now asceptically filled into sterile ampoules.
(4) The ampoules are sealed under aseptic conditions.

What is claimed:

1. A compound selected from the group consisting of 2-lower-alkyl-3-[2 - (3 - N-lower-alkylanilinopyrrolidinyl) ethyl]indole and acid addition salts thereof.

2. A compound selected from the group consisting of 3-[2-(3 - N - lower-alkylanilinopyrrolidinyl)ethyl]indole and acid addition salts thereof.

3. A compound selected from the group consisting of 5,6-di-lower-alkoxy - 3 - [2 - (3-N-lower-alkylanilinopyrrolidinyl)ethyl]indole and acid addition salts thereof.

4. A compound selected from the group consisting of 3 - [2 - (3 - N - lower-alkanoylanilinopyrrolidinyl)ethyl] indole and acid addition salts thereof.

5. 2-methyl-3-[2 - (3 - N - methylanilinopyrrolidinyl) ethyl]indole.

6. 3-[2-(3 - N - methylanilinopyrrolidinyl)ethyl]indole and its hexamate acid addition salt.

7. 5,6-dimethoxy-3-[2-(3-N-methylanilinopyrrolidinyl) ethyl]indole.

8. 3-[2-(3-anilinopyrrolidinyl)ethyl]indole.

9. 3 - {2 - [3 - (2 - methoxyanilino)pyrrolidinyl]ethyl} indole.

10. 3-{2-[3-(N - propionyl - 2 - methoxyanilino)pyrrolidinyl]ethyl}indole.

References Cited
UNITED STATES PATENTS
3,183,235  5/1965  Zenitz _____ 260—294

ALTON D. ROLLINS, Primary Examiner
J. A. NARCAVAGE, Assistant Examiner

U.S. Cl. X.R.
260—326.3, 326.5, 326.13, 326.15; 424—274